United States Patent [19]

Fowler

[11] Patent Number: 5,199,182
[45] Date of Patent: Apr. 6, 1993

[54] SHAFT ALIGNMENT DEVICE

[76] Inventor: James L. Fowler, 14704 W. 149th Ct., Olathe, Kans. 66062

[21] Appl. No.: 895,783

[22] Filed: Jun. 9, 1992

[51] Int. Cl.⁵ .............................................. G01B 5/25
[52] U.S. Cl. ...................................... 33/645; 33/412; 33/533
[58] Field of Search .................. 33/645, 412, 533, 228

[56] References Cited

U.S. PATENT DOCUMENTS

| | | | |
|---|---|---|---|
| 2,842,859 | 7/1958 | Pyciak ................................... | 33/645 |
| 3,711,955 | 1/1973 | Holt . | |
| 4,033,042 | 7/1977 | Bently . | |
| 4,102,052 | 7/1978 | Bloch . | |
| 4,161,068 | 7/1979 | McMaster .............................. | 33/412 |
| 4,196,522 | 4/1980 | Bell et al. ............................... | 33/645 |
| 4,222,173 | 9/1980 | Hall . | |
| 4,367,594 | 1/1983 | Murray, Jr. . | |
| 4,516,328 | 5/1985 | Massey . | |
| 4,534,114 | 8/1985 | Woyton et al. . | |
| 4,553,335 | 11/1985 | Woyton . | |
| 4,586,264 | 5/1986 | Zatezalo ................................ | 33/412 |
| 4,709,485 | 12/1987 | Bowman ................................ | 33/228 |
| 4,748,739 | 6/1988 | Muradliyan ........................... | 29/732 |
| 4,890,421 | 1/1990 | Moore, Jr. et al. . | |
| 4,928,401 | 5/1990 | Murray, Jr. ............................ | 33/645 |
| 5,048,195 | 9/1991 | Leonov .................................. | 33/645 |

FOREIGN PATENT DOCUMENTS 178780 4/1986 European Pat. Off. .............. 33/533

OTHER PUBLICATIONS

Wood's Sure-Flex Couplings brochure, Apr. 1986.
"Shaft Alignment Handbook", John Piotrowski, 1986.
"Basic Shaft Alignment Workbook for industrial rotating machinery", John Piotrowski, 1990.

Primary Examiner—William A. Cuchlinski, Jr.
Assistant Examiner—C. W. Fulton
Attorney, Agent, or Firm—D. A. N. Chase; Michael Yakimo, Jr.; Richard P. Stitt

[57] ABSTRACT

A device for aligning the shafts of adjacent driven and driver machinery units comprising a pair of congruent alignment plates connected to the coupling flange of each plate such that the axis of each shaft is normal to an identical point on each plate. A pair of centering bars positions each shaft with a coupling flange thereon in such position. Opposed keys on one plate are registered in corresponding keyways on the opposed plate by manipulation of the machinery. A gauge plate indicates any offset in the plates. Registration of the keys and superimposition of the congruent plates is achieved by machine manipulation to assure the user that an alignment in angularity and parallelism has been achieved. Bubble levels and dial indicator gauges are used in connection with the plates to enhance the alignment process.

21 Claims, 2 Drawing Sheets

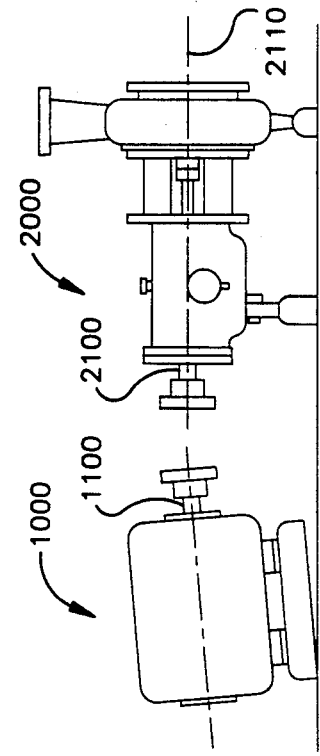
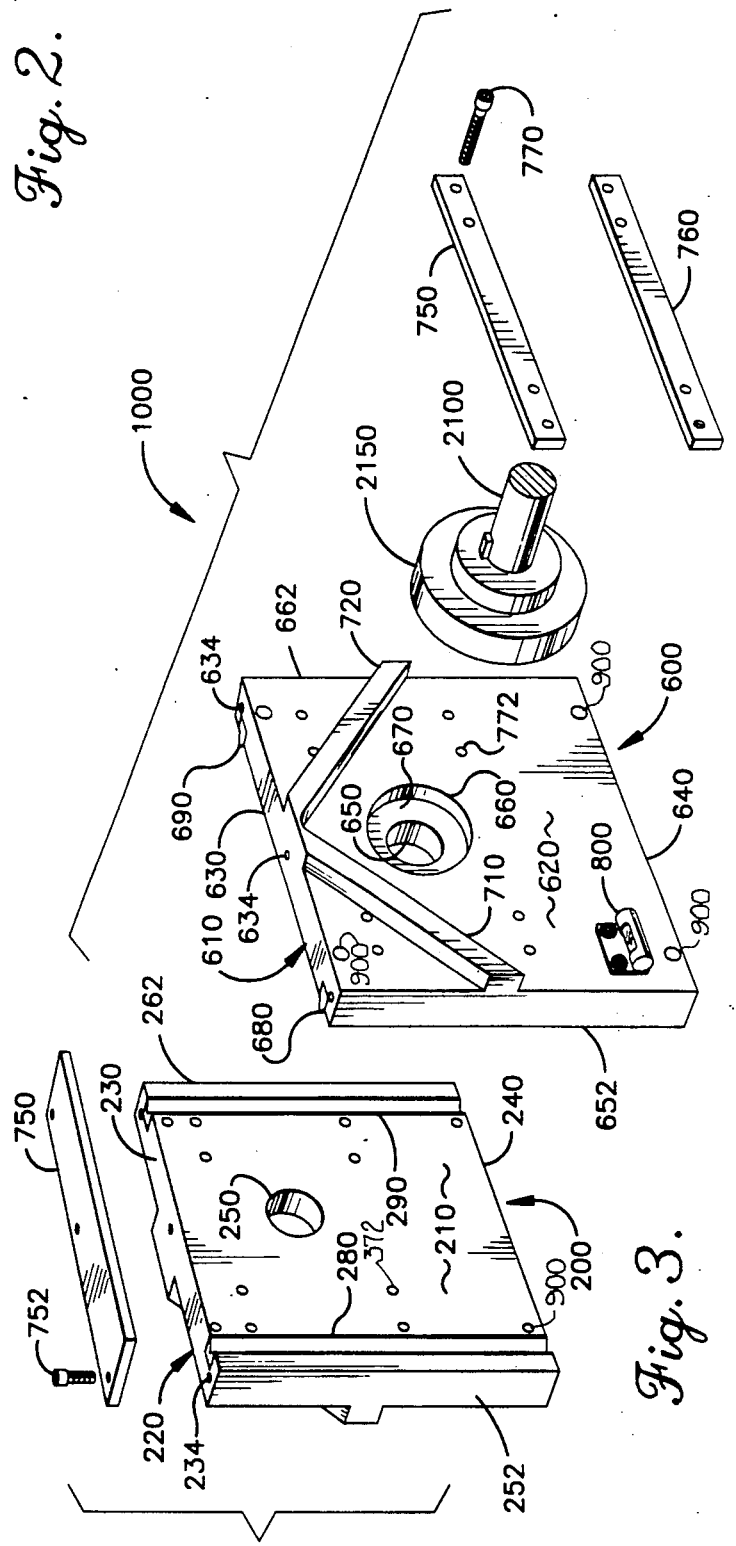

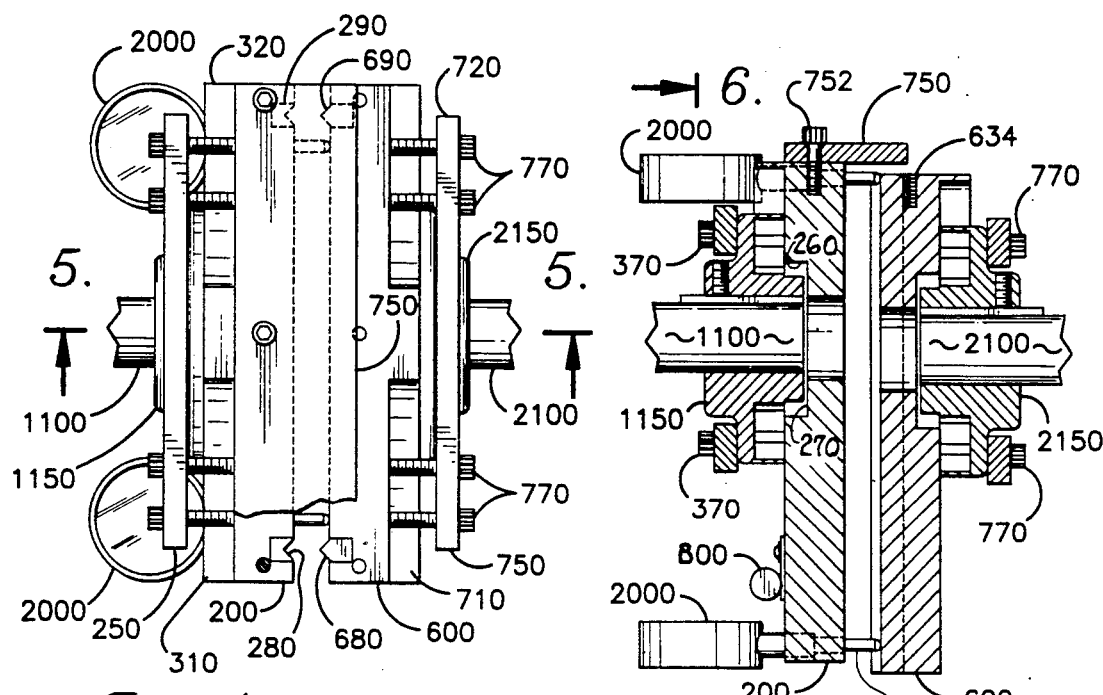
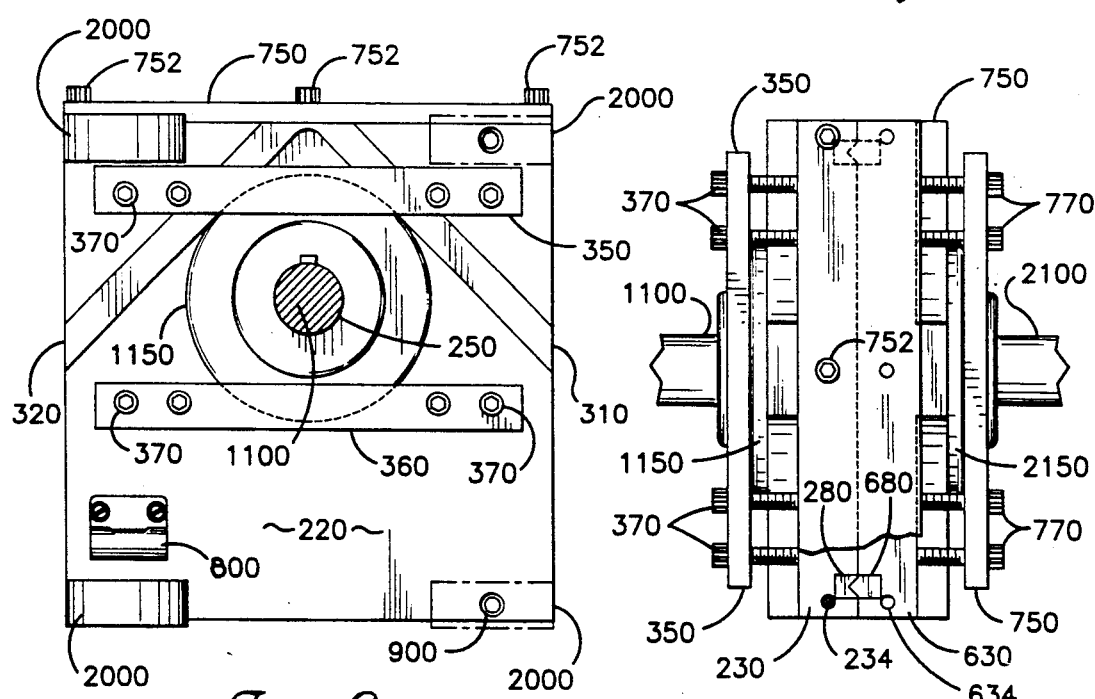

SHAFT ALIGNMENT DEVICE

BACKGROUND OF THE INVENTION

This invention relates to a shaft alignment device and, more particularly, to a device which easily aligns the driver and driven shafts of adjacent machine apparatus.

The problem of shaft alignment between two pieces of adjacent machinery have been present since the industrial revolution. It has long been desired to have adjacent shafts properly aligned so that the rotating equipment is running smoothly. Absent a proper shaft alignment, various problems can arise such as bearing wear, coupling disengagement and excessive noise. The advancements in obtaining accurate shaft alignment over the years is said to have been sporadic. Problems haven arisen due to inadequate training as well as inadequate equipment and/or tooling.

One recognized instructor in the shaft alignment field is John Piotrowski who has written various books in this field, including *The Shaft Alignment Handbook*, published in 1986 by Marcel Dekker, Inc. Therein is a discussion of shaft alignment and the various activities associated therewith. (TJ177.5.P56 1986 ISBN 0-8247-7432-9.) Mr. Piotrowski has also authored another book entitled the *Basic Shaft Alignment Workbook*, published in 1990 by Turvac Alignment Engineering Services.

It is believed by those skilled in the art, such as Mr. Piotrowski, that perfect alignment is difficult to achieve. Once aligned, rotating components tend to move to a state of misalignment. Generated heat, foundation movement and/or settling, and compression of gases all have a tendency to move the adjacent equipment.

Shaft misalignment can compromise a parallel or angular misalignment or a combination thereof. Coupling manufacturers set misalignment limits in degrees for angularity and mils (one mil equals 0.001 inches) for parallelism. Mils may be used for both angularity and parallelism.

It is posited that alignment of a small pump with a driver motor can be achieved in three to four hours assuming that all other factors are substantially perfect. Such factors include proper interpretation of dial readings, proper calculation of machinery movement, information of thermal movement, proper tools at the job site, no interference with pump piping, proper shims, no coupling hub or shaft runout, no dirt or rust buildup under the machinery, jack screws are available for machinery movement, shafts are freely rotatable and with no interruptions. Thus, a proper, cost-effective and timely shaft alignment depends on a number of various factors.

Various methods and/or devices are available for measuring the deviations in angularity and parallelism between shafts. Such methods include the "calibrated eyeball", the straight edge and tape method or feeler gauge method as shown in Mr. Piotrowski's workbook on page 26. Other utilized devices include alignment brackets for placement around one shaft or adjacent the shaft hub or face. Linkage between the bracket and dial indicators measure the differences in pitch or angularity between the opposed hubs and/or shafts. Thus, upon manipulation of the shafts to a desired position, the respective gauges will indicate when parallelism and proper angularity between the shafts has been reached.

Further advances in technology have produced a laser optic measurement system known as the Optiline system. A "Lineax" shaft to shaft alignment instrument is also available. Both systems are also discussed in Piotrowski.

Although assumably effective in operation the prior methods and/or alignment devices are all known to have inherent advantages and disadvantages. In some cases it is difficult to obtain proper dial readings either due to axial float, hub and shaft geometry as well as the distances between the shafts. As to the later technological advances in such systems, the cost of the system and/or the delicacy of the system components can inhibit their widespread use.

In response thereto I have invented an alignment device which utilizes a pair of identical, aluminum alignment plates for attachment to the driver and driven shafts. Upon a flush alignment of keys with mating keyways in the alignment plates, an alignment of angularity between the shafts is achieved. A congruent alignment between the plates achieves an alignment of parallelism between the shafts. Thus, the combination of the two achieves angularity and parallelism alignment. Dial indicator gauges and bubble levels are used in connection with the alignment plates so as to enhance the alignment and leveling processes.

It is therefor a general object of this invention to provide an alignment device for alignment of the driver and driven shafts of adjacent machinery units.

Another object of this invention is to provide an alignment device, as aforesaid, which utilizes a pair of alignment plates attached to the respective driver and driven shafts.

A still further object of this invention is to provide an alignment device, as aforesaid, which utilizes a mating of facing keys and keyways between in the plates to achieve an angularity alignment between the connected driver and driven shafts.

Another object of this invention is to provide means for superimposing the plates, as aforesaid, in a congruent relationship to achieve a parallel alignment between the connected driver and driven shafts.

Another object of this invention is to provide an alignment device, as aforesaid, which provides for a desired alignment of the axes of the driver and driven shafts respectively connected thereto.

A further object of this invention is to provide an alignment device, as aforesaid, which positions the alignment plates in a flush, planar relationship therebetween.

Still a further particular object of this invention is to provide an alignment device which positions the alignment plates in a desired vertical relationship therebetween.

A more particular object of this invention is to provide an alignment device, as aforesaid, which positions the plates in a desired relationship with the horizontal.

Another particular object of this invention is to provide an alignment device, as aforesaid, which is adaptable for use with variously sized driver and driven shafts.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 1 is a diagrammatic view showing a side-by-side relationship of a driver/motor unit and driven/pump unit with the axes thereof being misaligned in parallelism.

FIG. 2 is a diagrammatic view of the motor and pump shown in FIG. 1 with the axes thereof being misaligned in angularity.

FIG. 3 is a perspective, exploded view of the alignment device and showing a fragmentary portion of a shaft/coupling combination which is to be attached to the adjacent plate.

FIG. 4 is a top view of the first and second alignment plates prior to a mating engagement between the keys and opposing keyways of the respective plates.

FIG. 5 is a sectional elevation view, taken along lines 5—5 in FIG. 4, illustrating the plates being vertically offset with a plunger of a dial indicator extending through one plate.

FIG. 6 is an elevation view of one of the alignment plates, taken along line 6—6 in FIG. 5, showing the attachment of a shaft with coupling thereon to one of the coupling plates.

FIG. 7 is a top, plan view showing a flush, congruent alignment between the plates with a portion of the vertical offset gauge being broken away to show the flush engagement between one of the key/keyway combinations.

DESCRIPTION OF THE PREFERRED EMBODIMENT

Turning more particularly to the drawings, FIGS. 1 and 2 diagrammatically show a driver motor 1000 and an adjacent driven machinery unit 2000 such as a pump or the like. The respective shafts 1100, 2100 with couplings 1150, 2150 thereon are to be aligned into desired angular and/or parallel relationships. Shaft misalignment is shown in FIGS. 1 and 2, i.e. the shafts 1100, 2100 deviate from a collinear axis of rotation when the motor 1000 and pump 2000 are running at normal operating conditions.

FIG. 1 is a diagrammatic view of a parallel misalignment. As such, the imaginary, central, longitudinal axis 1110 extending through the shaft 1100 of the motor 1000 is at a parallel offset from the imaginary, central, longitudinal axis 2110 of the shaft 2100 of the pump 2000. Although FIG. 1 shows the axis 1110 being below axis 2110 the misaligned axis 1110 may be above axis 2110 as well as laterally displaced therefrom.

FIG. 2 is a diagrammatic view of an angular misalignment between the shafts 1100, 2100. As such the imaginary axis 1110 of motor 1000 shaft 1100 intersects, but is not collinear with, the imaginary axis 2110 of the pump 2000 shaft 2100.

During operation, parallel and/or angular misalignments can arise between the motor 1000 shaft 1100 and pump 2000 shaft 2100. Upon misalignment, a measurable deviation between the shaft 1100 axis 1110 and pump 2100 axis 2110 from the desired collinear position will occur. Since misalignment is measured in vertical and horizontal planes, four deviations can occur at each coupling, i.e. a horizontal deviation and a vertical deviation at the point of power transmission of the motor 1000 shaft 1100 and a horizontal deviation and a vertical deviation at the point of power transmission on the pump 2000 shaft 2100. Thus, the goal of alignment is to position the motor 1000 shaft 1100 and pump 2000 shaft 2100 such that these deviations are below certain tolerance values so as to approach, if not achieve, shaft collinearity.

As shown in FIGS. 1 and 2, circular coupling flanges 1150, 2150 are attached to the ends of each shaft 1100, 2100. In actual use, coupling sleeves (not shown) extend between the flanges 1150, 2150. The sleeves transmit the power between the coupling flanges 1150, 2150 on the rotating shafts 1100, 2100. The couplings 1150, 2150 with flexible sleeve therebetween also withstand various types of torsional shock and certain degrees of angular, parallel and axial misalignment. However, it is still desirable to align the shafts 1100, 2100 as close as possible so as to minimize the effects of initial shaft misalignment. Representative couplings are those shown in *Wood's Sure-Flex Couplings* brochure, copyright April 1986.

FIG. 3 illustrates a portion of the elements of my alignment device 100 in an exploded position. A fragmentary portion of the driven shaft 2100 and coupling 2150 thereon is shown. The alignment device 100 comprises congruent quadrangular driver shaft 1100 and driven shaft 2100 rectangular alignment plates 200, 600. The driver shaft 1100 alignment plate 200 comprises a central wall having a planar, interior surface 210 and an opposed, exterior surface 220 (FIG. 6). These opposed surfaces 210, 220 are bound by upper 230 and lower 240 walls with a pair of laterally displaced side walls 252, 262 spanning therebetween. Likewise, the driven shaft 2100 alignment plate 600 comprises a planar, interior surface 610 and an opposed exterior surface 620. These surfaces are bound by upper 630 and lower 640 walls with a pair of side walls 650, 660 spanning therebetween. Upon a proper contiguous placement of plate 200 with 600 the interior surfaces 210, 610 will be flush one to the other as well as the respective side walls, top walls and bottom walls.

Extending through the interior surfaces 210, 610 of each plate 200, 600 at identical locations are congruent bores presenting apertures 250, 650 on the interior surfaces 210, 610 of each plate 200, 600. As best shown in plate 600 in FIG. 3, enlarged apertures 260, 660 in exterior surfaces 220, 620 surround each bore 250, 650 so as to present shoulders 270, 670 surrounding the apertures of the opposed end of each bore and opposite each central aperture 250, 650.

A pair of laterally spaced apart keys 680, 690 normally project from the interior surface 610 of the plate 600. The keys 680, 690 extend between the top 630 and bottom 640 walls of plate 600. Located along the interior surface 210 of plate 200 are a pair of keyways 280, 290 designed to receive the keys 680, 690 in full registration therebetween. Upon such registration, the interior surfaces 210, 610 of the congruent plates 200, 600 are flush one to the other.

Located on the exterior surface 620 of plate 600 are a pair of centering or guide bars 710, 720. Each bar 710, 720 extends from a point on a respective side wall 652, 662 towards a midpoint on the top wall 630. These angled bars 710, 720 flank the central aperture 650 centrally located therebetween. The bars 710, 720 are relatively positioned to aperture 650 and each other so as to guide the coupling flange 2150 into a seated relationship therein. Upon a full seating of the coupling flange 2150 between the bars 710, 720 the imaginary, central, longitudinal axis 2110 of shaft 2100 normally extends through the center point of the aperture 650. Thus, the imaginary central axis 2110 of shaft 2100 is collinear with the imaginary central axis passing through the center of aperture 650. It is understood that the relative positioning among the bars 710, 720 and aperture 650 will vary according to the size of the coupling 2150 utilized so as to guide the coupling flange 2150 and shaft 2100 into this desired collinear relationship.

The alignment plate 200, as best shown in FIG. 6, utilizes similar centering bars 310, 320 which surround the central aperture 250. Accordingly, upon a proper full seating of the attached coupling 1150 of the driver shaft 1100 within the centering bars 310, 320 the imaginary, central, longitudinal axis 1110 of driver shaft 1100 will normally extend through the center of the central aperture 250 and lie collinear with the imaginary, central axis of aperture 250. (Alternatively, a target may be utilized instead of such apertures. The target may physically appear on the interior walls 210, 610 or may be just a predefined point thereon.)

Mounting brackets 350, 360, 750, 760 hold the respective couplings 1150, 2150 in their seated positions. These mounting brackets are secured to the respective exterior surfaces 220, 620 of the plates 200, 600 by bolts 370, 770 extending through the brackets and engaging the apertures 372, 772 in the exterior surface 220, 620 with the respective couplings 1150, 2150 therebetween.

Atop the top wall 230 of the plate 200 is mounted a gauge plate 750 by means of bolts 752 engaging apertures 234 in the top wall 230. Bubble level gauges 800 are mounted on the exterior surfaces 220, 620 of each plate 200, 600. Apertures 900 are located at the four corners of each mounting plate 200, 600 for insertion of the plungers 2010 of the dial indicators 2000 therethrough for a purpose to be subsequently described.

In use the coupling flange 2150 on the driven shaft 2100 is seated within the centering bars 710, 720 on the plate 600. Upon a full seating within the bars 710, 720, i.e. each bar 710, 720 is contiguous to a point about the flange 2150. Bubble level 800 levels the plate 600 relative to the horizontal. The mounting brackets 750, 760 are then secured to exterior surface 620 of plate 600 by bolts 770 engaging apertures 772. As previously discussed the relationship among the centering bars 710, 720 and the central aperture 650 is such that the imaginary, central, longitudinal axis 2110 of the shaft 2100 normally extends through the center of aperture 650 and is collinear with a normal axis passing therethrough.

Likewise, the driver shaft 1100 with coupling 1150 thereon is attached to exterior surface 220 of plate 200 upon a full seating of the coupling 1150 within the centering bars 310, 320. Upon leveling by level 800, mounting flanges 350, 360 secure hub 1150 to plate 200 by means of bolts 370 engaging apertures 372. As previously discussed the relationship among the centering bars 310, 320 and central aperture 250 is such that the imaginary, central, longitudinal axis of shaft 1100 normally extends through the center of aperture 250 and is collinear with the imaginary, longitudinal axis thereof.

As shown in FIG. 4, the initial position of the mounted alignment plates 200, 600 displace the keys 680, 690 from the respective keyways 280, 290. The motor 1000 then may be laterally moved and/or adjusted so that the keyways 280, 290 approach registration with the keys 680, 690. During such movement the deviations between the keys 680, 690 and keyways 280, 290 may be measured by the dial indicators 2000 inserted in the four corner apertures 900 in plate 200. As shown in FIG. 5 the plungers 2010 of the respective dial indicators 2000 project through these corner apertures 900. Movement of the plunger 2010 corresponds to the deviation between the interior surfaces 210, 610 which will be indicated on the dial 2000. Thus, the dial readings will indicate to the user the distance between the interior surfaces 210, 610 of plates 200, 600 at such corner locations. Upon determining such distances, if any, the user can manipulate the motor 1000 so as to likewise manipulate the attached alignment plate 200 until a full registration/seating of keys 680, 690 in keyways 280, 290 is achieved. This registration achieves a flush fit of the interior surfaces 210, 610 one to the other. (It is understood that usually the motor 1000 is adjusted as pump 2000 adjustment may be limited due to the pump size and/or piping extending therefrom. However, in some cases either the motor or pump may be adjustable to achieve a key/keyway registration.)

Upon a proper registration of the keys 680, 690 within the keyways 280, 290 the user is assured that an alignment of the angularity between the shafts 1100, 2100 can be achieved. Also, the shafts 1100, 2100 have been aligned in lateral directions but may be vertically offset or misaligned. If so, as shown in FIG. 5, a parallel misalignment or offset between the shafts 1100, 2100 may still remain as shown by an offset between plates 200, 600.

FIG. 5 shows the plates 200, 600 prior to a proper registration between the keys 680, 690 and keyways 280, 290. A misalignment of parallelism is shown as there is a spatial relationship between gauge plate 750 and the top wall 630 of the plate 600. This distance can be measured by a feeler gauge or the like. If the top wall 630 of plate 600 is higher than the top wall 230 of plate 200, the gauge plate 750 may be bolted to apertures 634 atop wall 230 and the distance the determined. Accordingly, once the vertical distance is determined the motor 1100 can be raised or lowered as required by shims or the like until the gauge plate 750 is flush with top wall of the opposed alignment plate. Upon alignment the plates 200, 600 will be superimposed or congruent one to the other, as shown in FIG. 7, such that the interior surfaces as well as the top, bottom and side walls are flush one with the other. This congruent relationship between plates 200, 600 assures the user that the imaginary axes of the attached shafts 1100, 2100 are collinear and thus aligned in parallelism. As the registration of keys 680, 690 within keyways 280, 290 assures the user that an angularity alignment has been achieved, the shafts 1100, 2100 are aligned in parallelism and angularity.

Once such alignments are achieved the plates 200, 600 are removed and the flexible sleeve is connected between the opposed couplings 1150, 2150.

It is here noted that the congruent plates 200, 600 have been associated with the driver 1100 and driven 2100 shafts. It is understood that the plates 200, 600 may be reversed if the user so desired. Moreover, it is understood that the dimensions of the centering bars 310, 320, 710, 720 and their relationship to the central apertures 250, 650 (or target points) will be determined by the size of the utilized couplings 1150, 2150. These relative dimensions and positions are important to assure the user that a full seating of the respective couplings within the respective centering bars will cause the longitudinal axes of the respective shafts to achieve a collinear relationship upon achieving congruency between plates 200, 600.

It is to be understood that while certain forms of this invention has been illustrated and/or described, it is not limited thereto except insofar as such limitations are included in the following claims and allowable functional equivalents thereof.

Having thus described the invention what is claimed as new and desired to be secured by Letters Patent is as follows:

1. An alignment device for aligning a driver shaft with a driven shaft of adjacent machinery units comprising:
   a first plate;
   an aperture in said plate;
   means on said first plate for positioning an imaginary, central, longitudinal axis of said driver shaft in a normal position relative to a center of said first plate aperture;
   bracket means for connecting said driven shaft to said first plate in said normal position;
   at least one key element extending along a surface of said first plate;
   a second plate having a configuration congruent to said first plate;
   an aperture in said second plate at a position identical to said first plate aperture;
   means on said second plate for positioning an imaginary, central, longitudinal axis of said driven shaft in a normal position relative to a center of said second plate aperture;
   bracket means for connecting said driven shaft to said second plate in said normal position;
   a keyway on a surface of said second plate for registering said at least one key element therein, at least one of said shafts being user manipulated in a manner to register said at least one key in said keyway and position said plates in congruency, whereupon to place said attached driver and driven shafts in a desired relative position therebetween.

2. The device as claimed in claim 1 wherein each positioning means on said first and second plates comprises:
   guide means surrounding said respective plate aperture for directing said respective shaft into said normal position relative to said aperture.

3. The device as claimed in claim 2 wherein each guide means comprises:
   a first bar on a surface of said plate displaced from said aperture;
   a second bar on a surface of said plate displaced from said aperture, said first and second bars contacting a portion of said respective shaft upon said shaft reaching said normal position.

4. The device as claimed in claim 3 wherein a coupling flange is at an end of each shaft, each guide means contacting each coupling flange upon each shaft reaching said normal position.

5. The device as claimed in claim 1 wherein said bracket means comprises:
   at least one bar;
   means for fixing said at least one bar to said plate with a portion of said shaft therebetween to preclude movement of said shaft from said normal position.

6. The device as claimed in claim 1 further comprising means for indicating an offset between said first and second plates upon said registration of said at least one key in said corresponding keyway.

7. The device as claimed in claim 6 wherein said indicating means comprises:
   a gauge plate;
   means for attachment of said gauge plate to one of said plates, said gauge plate being displaced from a corresponding position on the other of said plates to indicate the offset between said plates.

8. The device as claimed in claim 7 wherein said gauge plate is attached by said means to a top wall of one of said plates, said gauge plate being displaced from a top wall of the other of said plates upon an offset between said plates.

9. The device as claimed in claim 1 further comprising means for indicating the offset between said at lest one key element and said keyway prior to said registration.

10. The device as claimed in claim 9 wherein said indicating means comprises:
    at least one bore extending through one of said plates;
    a dial indicator gauge having a reciprocal plunger for insertion through said at least one bore, said plunger extending through said plate and contacting the other plate, said contact operating said indicator in a manner to indicate the distance between said first and second plates at the location of said bore.

11. The device as claimed in claim 1 further comprising:
    a bubble level on at least one of said plates for positioning said plate on said shaft in a desired position relative to the horizontal.

12. An alignment device for aligning a driver shaft with a driven shaft of adjacent machinery units comprising:
    a first plate having a generally quadrangular configuration comprising:
    a top wall;
    a bottom wall;
    first and second side walls;
    a central wall spanning said walls and presenting opposed exterior and interior surfaces;
    a bore extending through said central wall in said first plate and presenting terminal apertures on said opposed surfaces;
    guide means on said exterior surface of said first plate for directing an imaginary, central, longitudinal axis of said driver shaft in a position collinear to a central, longitudinal axis of said first plate bore;
    means for connecting said driver shaft to said first plate in said collinear position;
    at least one male element extending along an interior surface of said first plate;
    a second plate having a configuration congruent to said first plate, said second plate comprising:
    a top wall;
    a bottom wall;
    first and second side walls;
    a central wall spanning said walls and presenting opposed, exterior and interior surfaces;
    a bore in said second plate at a relative position identical to said relative position of said first plate bore, said second plate bore extending through said central wall in said second plate and presenting terminal apertures on said opposed surfaces;
    guide means on said exterior surface of second plate for directing an imaginary, central, longitudinal axis of said driven shaft in a position collinear to a central, longitudinal axis of said second plate bore;
    means for connecting said driven shaft to said second plate in said collinear position;

female means on said interior surface of said second plate for registering said at least one male element therein, at least one of said shafts being user manipulated in a manner to register said at least one male element in said female means and position said plates in congruency, whereupon to place said attached driver and driven shafts in a desired relative position therebetween.

13. The device as claimed in claim 12 further comprising a coupling flange at an end of said shaft, said guide means contacting said coupling flange upon said shaft reaching said collinear position.

14. The device as claimed in claim 12 further comprising means for indicating an offset between the congruency of said first and second plates upon said registration of said at least one key in said corresponding keyway.

15. The device as claimed in claim 12 further comprising means for indicating the offset between said at least one male element and said female means prior to said registration.

16. The device as claimed in claim 12 further comprising:
 a bubble level on at least one of said plates for positioning said plate on said shaft in a desired position relative to the horizontal.

17. An alignment device for aligning a driver shaft structure with a driven shaft structure of adjacent machinery units comprising:
 a first plate;
 a target on said plate;
 means on said first plate for positioning an imaginary, central, longitudinal axis of said driver shaft in a normal position relative to said target;
 means for connecting said driver shaft to said first plate in said normal position;
 at least one male element extending along a surface of said plate;
 a second plate having a configuration congruent to said first plate;
 a target in said second plate at a position identical to said first plate target;
 means on said second plate for positioning an imaginary, central, longitudinal axis of said driven shaft in a normal position relative to said second plate target;
 means for connecting said driven shaft structure to said second plate in said normal position;
 a female element on a surface of said plate for registering said at least one male element therein, at least one of said shafts being user manipulated in a manner to register said at least one male element in said female element and position said plates in congruency, whereupon to place said attached driver and driven shafts in a desired relative position therebetween.

18. The device as claimed in claim 17 wherein each positioning means on said first and second plates comprises:
 guide means surrounding said respective plate target for directing said respective shaft into said normal position relative to said aperture.

19. The device as claimed in claim 17 further comprising means for indicating an offset between the congruency of said first and second plates upon said registration of said at least one male element in said corresponding female element.

20. The device as claimed in claim 17 further comprising means for indicating the offset between said at lest one male element and female element prior to said registration.

21. The device as claimed in claim 17 further comprising:
 a bubble level on at least one of said plates for positioning said plate on said shaft structure in a desired position relative to the horizontal.

* * * * *

UNITED STATES PATENT AND TRADEMARK OFFICE
CERTIFICATE OF CORRECTION

PATENT NO. : 5,199,182
DATED : April 6, 1993
INVENTOR(S) : James l. Fowler

It is certified that error appears in the above-indentified patent and that said Letters Patent is hereby corrected as shown below:

Column 7, line 18, delete "driven" and substitute --driver--.

Signed and Sealed this

Eighteenth Day of January, 1994

Attest:

BRUCE LEHMAN

Attesting Officer     Commissioner of Patents and Trademarks